United States Patent
Kramer

(10) Patent No.: US 7,624,163 B2
(45) Date of Patent: Nov. 24, 2009

(54) AUTOMATIC CONFIGURATION INFORMATION GENERATION FOR DISTRIBUTED COMPUTING ENVIRONMENT

(75) Inventor: David A. Kramer, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 1104 days.

(21) Appl. No.: 10/971,601

(22) Filed: Oct. 21, 2004

(65) Prior Publication Data

US 2006/0089973 A1    Apr. 27, 2006

(51) Int. Cl.
 G06F 15/177 (2006.01)
 G06F 15/16 (2006.01)
 G06F 15/173 (2006.01)
(52) U.S. Cl. ............... 709/220; 709/209; 709/208; 709/223
(58) Field of Classification Search ............. 709/201, 709/208, 209, 220, 222, 223
See application file for complete search history.

(56) References Cited

U.S. PATENT DOCUMENTS

| | | | |
|---|---|---|---|
| 6,345,294 B1 * | 2/2002 | O'Toole et al. | 709/222 |
| 7,225,243 B1 * | 5/2007 | Wilson | 709/223 |
| 7,340,654 B2 * | 3/2008 | Bigagli et al. | 714/47 |
| 2005/0154789 A1 * | 7/2005 | Fellenstein et al. | 709/223 |
| 2005/0237949 A1 * | 10/2005 | Addessi | 370/255 |

OTHER PUBLICATIONS

W. Gropp and E. Lusk; Dyanamic Process Management in an MPI Setting; Apr. 20, 1995; Mathamatics and Computer Science Division, Argonne National Laboratory; abstract, p. 13.*

Foster, Ian, et al., "The Anatomy of the Grid," Enabling Scalable Virtual Organizations, Mathematics and Computer Science, The University of Chicago, Chicago IL 60657, 25 pages.
"Research Papers from Globus Alliance Members," Globus Publications—Research Papers, Located at http://www-unix.globus.org/alliance/publications/papers.php, 21 pages.

* cited by examiner

*Primary Examiner*—Salad Abdullahi
*Assistant Examiner*—Madhu Khanna
(74) *Attorney, Agent, or Firm*—Sawyer Law Group, P.C.

(57) ABSTRACT

A method and system for configuring information for a distributed computing environment is provided. The method and system comprises providing a job containing a list of tasks to a controller, the tasks including a bootstrap tool and configuration information related to the computer network. The method and system also comprises providing a task to each of a plurality of agents on the distributed computer network, each task being based on one of the tasks of the job. The method and system further comprises executing code by each of the plurality of agents based upon the tasks process, wherein the code provides configuration information for a master process and a plurality of slave processes within the distributed computer network.

The present invention allows processes run on a distributed set of computers to be provided with appropriate configuration files without requiring the master node to pre-generate those files ahead of time. Specifically, the invention generates the configuration files on the computers that will host the processes. A special bootstrap tool is run on each machine. This tool provides a unique identifier to each process. Each machine running a slave process sends the master process its address, and the master returns a port number.

25 Claims, 7 Drawing Sheets

100

MP-Bootstrap

Executable code

Arguments:

Master ≈ One is?
Slave ≈ all others
Service Name (82-1160)

Fig. 6

AUTOMATIC CONFIGURATION INFORMATION GENERATION FOR DISTRIBUTED COMPUTING ENVIRONMENT

FIELD OF THE INVENTION

The present invention relates generally to generating configuration files and more particularly to generating configuration files in a distributed computing environment.

BACKGROUND OF THE INVENTION

Configuration files are required in a distributed computing environment to allow each of the computers of such a network to communicate with each other. FIG. 1 is a block diagram of a conventional distributed computing process 10. The computing process 10 comprises a user 12 which sends configuration files to a master process 14. The master process 14 then initiates all of the slave processes 16, 18 and 20. Typically the computers which run these processes must have a standard convention to allow for communications between computers within a distributed computing environment. A typical convention for such an environment is the use of the message passing interface (MPI). Using such an interface on applications run on such computers allows for communication therebetween. Accordingly, the standard way to generate the configuration files used to run an MPI application on a cluster of computers in a distributed environment is to start with a list of the computers in the cluster that will be hosting the MPI processes and determine based on their addresses and the number of CPUs in each computer what the contents of each configuration file should be, and then send the appropriate configuration file to each computer, and then start all of the slave processes, and finally start the master process.

This standard method of configuration file generation is not possible if you do not have a list of IP addresses and CPU counts ahead of time of the computers that run the MPI processes. To explain this problem in more detail refer to the following. Apple Computer provides, for example, Xgrid, a suite of applications which runs computational intensive applications. Xgrid enables administrators to group locally networked computers or nodes into clusters or grids and allows users on the network to remotely submit long-running computations as jobs to the clusters. Xgrid then creates multiple tasks for each job and distributes those tasks among multiple nodes, which can be either multipurpose desktops or dedicated cluster nodes.

Distributed Computing Under Xgrid Architecture

FIG. 2 is a block diagram of a distributed computing environment cluster 100.

Components

A cluster comprises three main software components:

1. An agent 106-110 runs one task at a time per CPU, in either dedicated mode or screensaver mode.

2. A controller 104 queues tasks, distributes those tasks to agents, and handles failover.

3. A client 102 submits jobs to the controller in the form of multiple tasks.

A user interacts with the grid via the client. The client uses a multicast broadcast, for example, from Rendezvous or an internet protocol (IP) address/hostname to find a controller to submit a job—a collection of execution instructions that may include data and executables. The controller 104 accepts the job and its associated files, and communication with the agents. Agents 106-110 accept the jobs, perform the calculations, and return the results to the controller, which aggregates them and returns them to the appropriate client.

In principle, all three components can run on the same computer, but it is often more efficient to have a dedicated controller.

Client 102

A user submits a job to the controller via an Xgrid client application, using either the command-line (Xgrid) or a graphical user interface application built using the Xgrid application framework. The user defines the parameters for the job to be executed in the Xgrid client, and these are sent to the controller. When the job is complete, the client is notified and can retrieve the results from the controller.

Any system can be an Xgrid client provided it has the Xgrid application installed and has a network connection to the controller system. In general, the client submits a job to a single controller at a time.

Controller 104

The controller service (xgridcontrollerd) manages the communications and the resources of the clusters. The xgridcontrollerd process accepts network connections from clients and agents. It receives job submissions from the clients, breaks the jobs up into tasks, dispatches tasks to the agents and provides feedback to the clients.

Agents 106, 108, 110

The agents handle running the computational tasks that comprise a job. When an agent (xgridagentd) starts running at startup it registers with the controller, which sends instructions and data to the xgridagentd when appropriate. An agent can be connected to only one controller at a time. Once the instructions from the controller are received, the agent then executes the appropriate code and sends the results back to the controller.

Accordingly, Xgrid allows a client to submit a list of processes to run on distributed set of computers but does not let them decide ahead of time which computers will be hosting which processes. Using a system such as Xgrid not only does the client not know the IP addresses of the computer that will be assigned to run the processes, but the client also does not know how many processes will be run on each computer. Therefore it is impossible for the client to generate either the master configuration file or the slave configuration files for the processes.

Accordingly, as before mentioned, the standard way to generate the configuration files used to run a MPI application on a cluster of computers is to start with a list of the computers in the cluster that will be hosting the MPI processes and determine based on their addresses and the number of CPUs in each computer what the contents of each configuration file should be, and then send the appropriate configuration file to each computer, and then start all of the slave processes, and finally start the master process.

This standard method of configuration file generation is not possible if a list of IP addresses and CPU counts is not available ahead of time for the computers that run the MPI processes.

Accordingly, what is needed is a system and method for configuration file generation which does not require a list of addresses and CPU counts ahead of time. The system and method should be easily implemented on existing systems and should be adaptable therewith. The present invention addresses such a need.

SUMMARY OF THE INVENTION

A computer readable medium, method and system for configuring information for a distributed computing environment is provided. The method and system comprises providing a job containing a list of tasks to a controller, the tasks including a bootstrap tool and configuration information related to the computer network. The method and system also comprises providing a task to each of a plurality of agents on the distributed computer network, each task being based on one of the tasks of the job. The method and system further comprises executing code by each of the plurality of agents based upon the tasks process, wherein the code provides configuration information for a master process and a plurality of slave processes within the distributed computer network.

The present invention allows processes run on a distributed set of computers to be provided with appropriate configuration files without requiring the master node to pre-generate those files ahead of time. Specifically, the invention generates the configuration files on the computers that will host the processes. A special bootstrap tool is run on each machine. This tool provides a unique identifier to each process. Each machine running a slave process sends the master process its address, and the master returns a port number.

BRIEF DESCRIPTION OF THE DRAWINGS

FIG. 6 illustrates a bootstrap command in accordance with the present invention.

DETAILED DESCRIPTION

The present invention relates generally to generating configuration files and more particularly to generating configuration files in a distributed computing environment. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
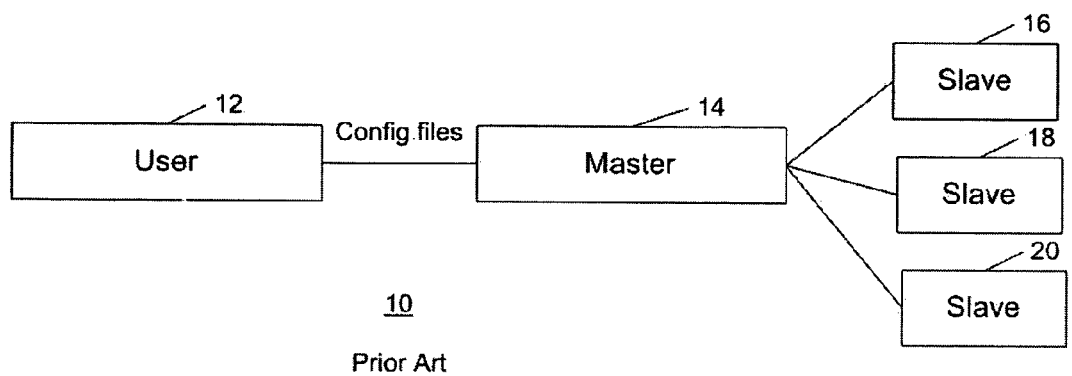
FIG. 1 is a block diagram of a conventional distributed computing environment.
Figure 2:
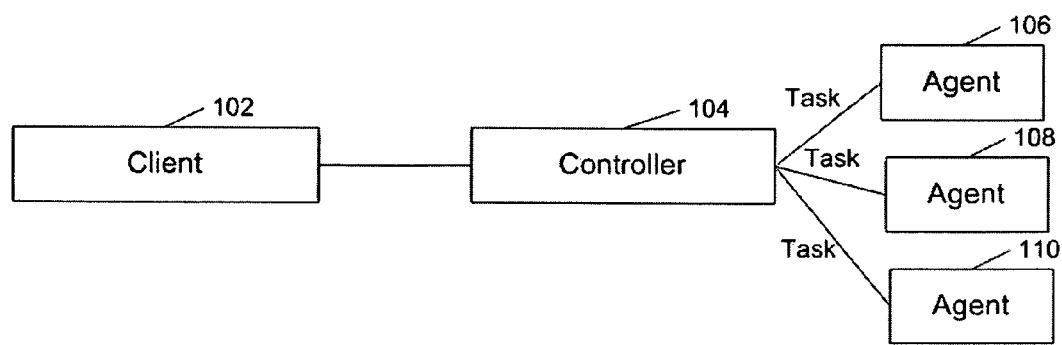
FIG. 2 is a block diagram of a distributed computing environment cluster.
Figure 3:
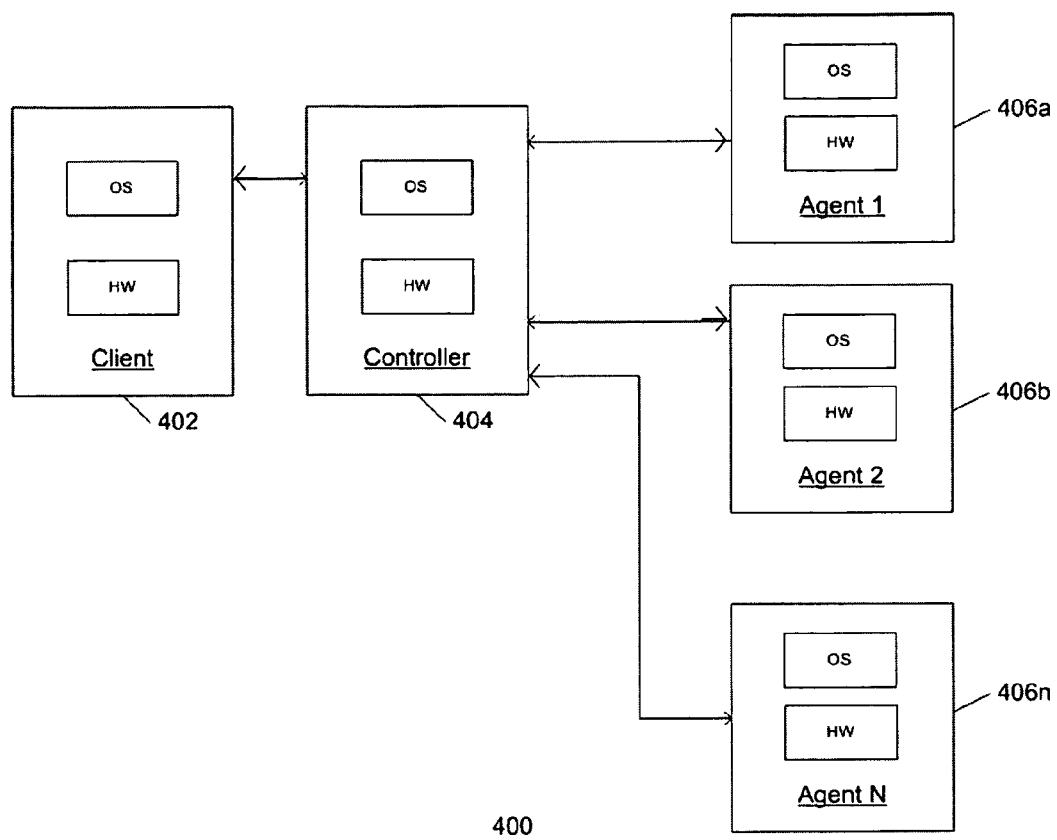
FIG. 3 illustrates an extended version of the distributed computing environments.

FIG. 3 illustrates a distributed computing system 400 in accordance with the present invention. In this system a client 402 provides configuration files to a controller 404. The controller 404 in turn provides the appropriate processes to the agents 406a-406n. Each of the client 402, controller 404 and agents 406a-n includes an operating system and hardware.

Figure 4:
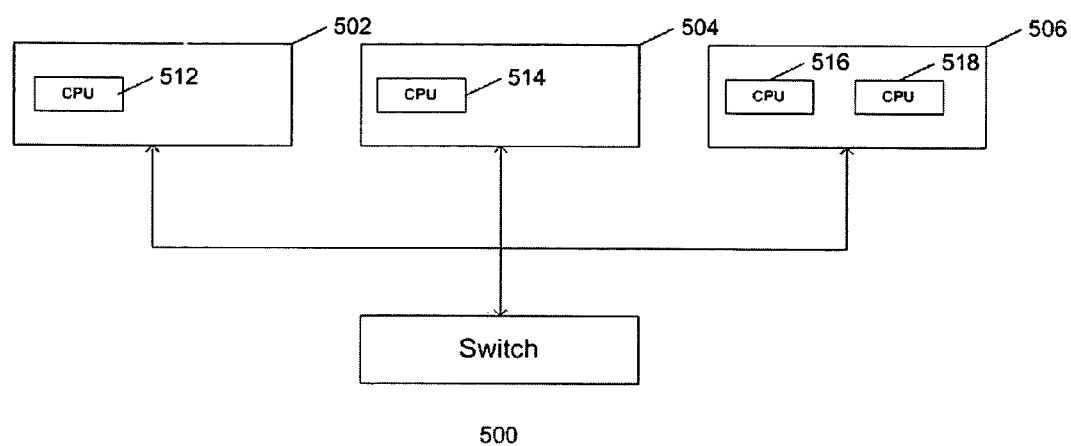
FIG. 4 illustrates distributed processors.

These processes could be run as separate CPUs or some of the processes could share a CPU. As is seen in FIG. 4, a distributing computing environment includes a cluster of computers 502-506. As is seen, computers 502 and 504 include one CPU 510 and 512 while computers 506 include two CPUs 516 and 518.

A library implements the message passing interface (MPI) standard on the cluster of computers and requires the presence of a configuration file in the working directory of each process that makes up the application. There is usually one process per CPU. The content of each configuration file depends on the contents of the rest of the configuration files.

Figure 5:
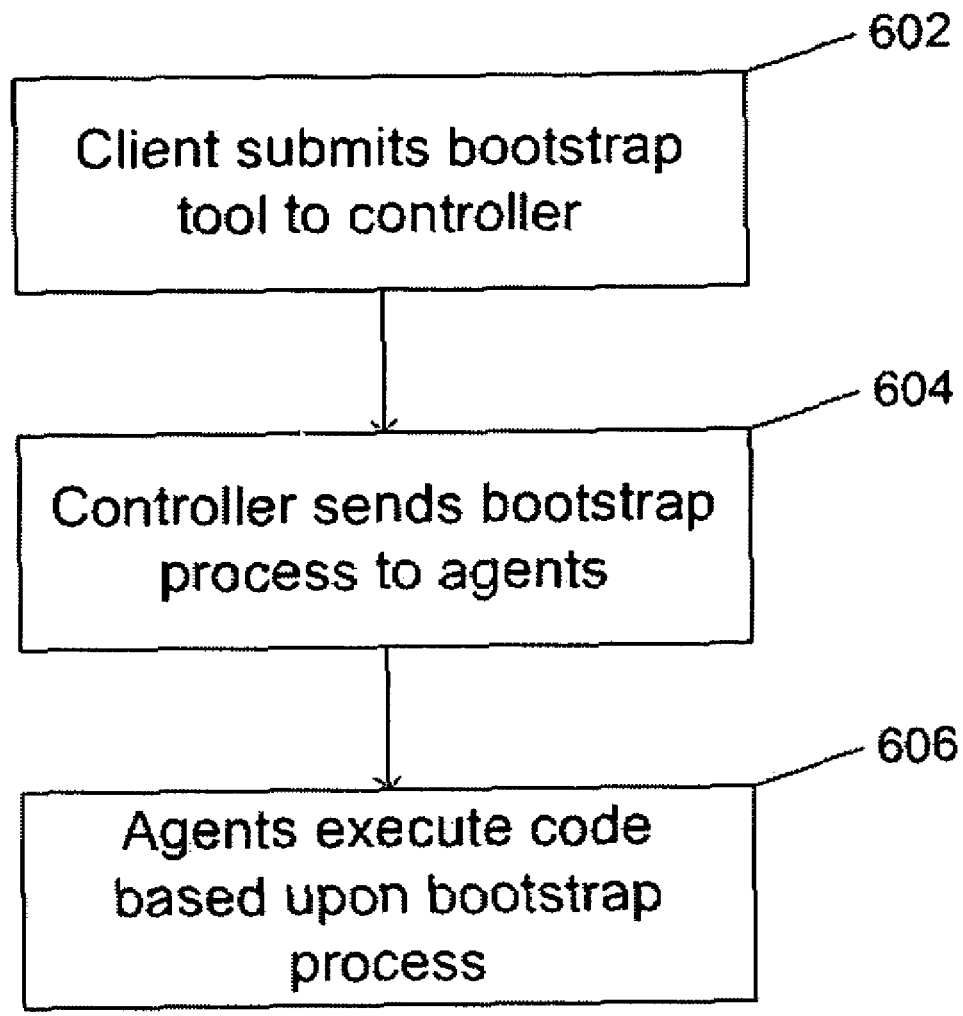
FIG. 5 is a flow chart of a configuration mechanism in accordance with the present invention.

The first process is known as the master process, and the configuration file contains a base port number, and the internet protocol (IP) addresses of computers hosting the rest of the MPI processes. If two processes are being hosted on the same computer (for instance, on the computer 506 with two CPUs as shown in FIG. 5) then the same IP address will be listed twice in the master process' configuration file. As required by the library, the first MPI process on a computer with a given IP address must have a configuration file that contains the base port number.

However, the second MPI process on a computer with that IP address must have a configuration file that contains the base port number incremented by one. Each additional MPI process hosted at that IP address must have a configuration file with a port number one greater that the port number used by the last MPI process. Therefore, the contents of each configuration file depends on the IP addresses of all of the computers hosting the MPI processes, and the number of processes being hosted at each IP address.

A system and method in accordance with the present invention generates the configuration files on the computers that will be hosting the processes, once all of the processes have been acquired.

The generation of configuration files is accomplished by submitting a special bootstrap tool within a job to run first, instead of submitting each of the MPI processes. There is one task for each desired MPI process, which handles the generation of the appropriate (master or slave) configuration file and then starts the MPI process as a child.

FIG. 5 illustrates a simple flow chart of a method for generating configuration files in accordance with the present invention. First, the client submits a job containing a bootstrap tool to the controller, via step 602. Next, the controller sends a task to each of the agents based upon the job, via step 604. Finally, each of the agents execute code for their configuration files based upon its task, via step 606.

To describe the features of the present invention in more detail, refer to the following description in conjunction with the accompanying figures. A listing for the bootstrap tool is illustrated in FIG. 6. The bootstrap tool listing includes the bootstrap tool name (MP-Bootstrap) code for executing the bootstrap mechanism (Executable) and arguments associated with the bootstrap tool. The key arguments are which process is the master process (master==one is?), which processes are the slave processes (Slave=all others) and a unique identifier (service name). The controller provides the same unique identifier to each task to use as a multicast signal via, for example, Rendezvous, by Apple Computer. The unique identifier, for example, could be service name 82-116 as shown in FIG. 4. The task that is going to generate the master configuration file opens a network port for listening and advertises the port using a multicast signal such as Rendezvous and uses the unique identifier as the service name.

Each of the processes that are going to generate each of the slave configuration files browse for the master task's port and connect to it. Each slave process sends the master process their IP address, and the master process returns a base port number. If this is the first time the master process has received the IP address, it sends the base port number. For each subsequent instance of the same IP address received, it sends the last port number sent for that IP address, incremented by one. For example, if the base port number is 5000, then the next time a slave process sends an identical IP address the master process will return a port number of 5001. Thus each slave process is able to write a configuration file with the correct port number, regardless of how many processes have been assigned to the same computer.

Once the master process has received an IP address from each slave process (and it knows ahead of time how many it is looking for) it writes the master configuration file. It then sends a message to each slave process telling it to start its MPI process. Once all of the slave processes have been started and the slave processes have indicated so to the master process, the master process starts the master MPI process.

Figure 7:
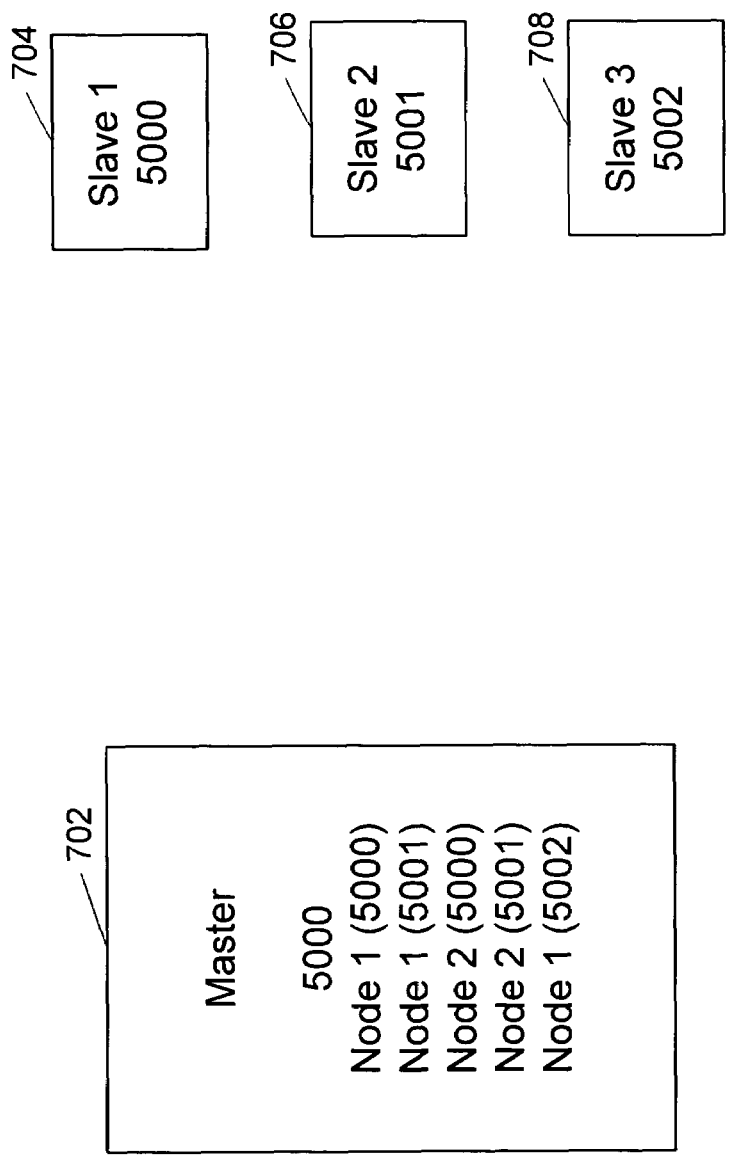
FIG. 7 illustrates a master process files and a plurality of slave process files.

FIG. 7 illustrates a configuration file for the master process 702 and configuration for each of the slave processes 704-708. As is seen, the master process configuration files include a listing of all the slave process nodes and ports. The slave process configuration files include their respective port numbers. As is seen, the base port numbers have been incremented appropriately.

Accordingly, a system and method in accordance with the present invention allows a collection of processes that are to be run on a distributed set of computers connected by an IP network to be provided with appropriate configuration files, without having to generate those configuration files on a single computer ahead of time. As long as the client generates a truly unique identifier to be used for the service name, and tells the master exactly how many slaves there are, and starts the bootstrapping tools on each computer (in any order), the application can run correctly.

Advantages

The advantage of this invention over other products is that it requires no configuration ahead of time. The client who wants to run the MPI application does not need to have a list of computer IP addresses ahead of time, and does not need to know how many CPUs each computer has. The only manual configuration necessary is to decide how many total MPI processes should run. By taking advantage of multicast DNS and a locally unique service name, the tasks are able to find each on the link-local network other no matter which computers they are run on. By having the master process keep track of how many slaves have registered with a given IP address, the number of processes per computer does not need to be known ahead of time.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for configuring a distributed computer network, the method comprising:
    providing, by a client, a job containing a list of tasks to a controller, the tasks including a bootstrap tool and configuration information related to the computer network;
    providing a task containing a bootstrap process to each of a plurality of agents on the distributed computer network, each task being one of the tasks of the job, wherein the controller provides a unique identifier to each task; and
    executing code by each of the plurality of agents based upon the provided task, wherein the code provides configuration information for a master process and a plurality of slave processes within the distributed computer network, wherein the task that generates the master process opens a network port and advertises the port via a multicast signal, and wherein each of the tasks for the slave processes browses for the network port and sends the network port an address associated with the agent hosting the slave process, the master process returning a base port number for a new address and the master process returning a last port number returned to the address incremented by one for a subsequent task using the same address.

2. The method of claim 1 wherein a controller performs the task providing step.

3. The method of claim 1 wherein the job includes arguments for determining the master and slave processes and a unique identifier.

4. The method of claim 3 wherein the master process includes a list of slave processes and their port numbers.

5. The method of claim 4 wherein each of the slave processes includes its port number.

6. The method of claim 3 wherein the unique identifier comprises a service name.

7. The method of claim 1 wherein computers within the network operate in accordance with a message passing interface (MPI) standard.

8. The method of claim 1 wherein the computer network includes a plurality of computers wherein at least one computer includes a plurality of CPUs.

9. The method of claim 1 wherein at least one task starts an MPI (message passing interface) process as a child.

10. The method of claim 1 wherein the address is an IP address and the same address results from a computer having more than one CPU.

11. The method of claim 1 wherein each of the plurality of agents is hosted by a computer within the distributed computer network.

12. The method of claim 1, further comprising:
    instructing each slave process to start an MPI (message passing interface) process;
    receiving confirmation of each MPI process starting; and
    starting a master MPI process.

13. A distributed computer environment comprising:
    a client, the client including a job, the job including a list of tasks, the tasks including a bootstrap tool and configuration information related to the distributed computer environment;
    a controller configured to receive the job and provide a unique identifier to each task; and
    a plurality of agents, each of the plurality of agents receiving a task, the task being based on one of the tasks of the job, wherein each of the plurality of agents executes code based upon the received task, wherein the plurality of tasks provides configuration for a master process and a plurality of slave processes within the distributed computer environment, wherein the task that generates the master process opens a network port and advertises the port via a multicast signal, and wherein each of the tasks for the slave processes browses for the network port and sends the network port an address associated with the agent hosting the slave process, the master process returning a base port number for a new address and the master process returning a last port number returned to the address incremented by one for a subsequent task using the same address.

14. The distributed computer network of claim 13 wherein the job includes arguments for determining the master and slave processors and a unique identifier.

15. The distributed computer network of claim 14 wherein the master process includes a list of slave processes and their port numbers.

16. The distributed computer network of claim 15 wherein each of the slave processes includes its port number.

17. The distributed computer network of claim 14 wherein the unique identifier comprises a service name.

18. A computer readable storage medium containing program instructions for configuring a distributed computer network, the program instructions comprising:

providing, by a client, a job containing a list of tasks to a controller, the tasks including a bootstrap tool and configuration information related to the computer network;

providing a task containing a bootstrap process to each of a plurality of agents on the distributed computer network, each task being one of the tasks of the job, wherein the controller provides a unique identifier to each task; and executing code by each of the plurality of agents based upon the provided task, wherein the code provides a portion of configuration information for a master process and a plurality of slave processes within the distributed computer network, wherein the task that generates the master process opens a network port and advertises the port via a multicast signal, and wherein each of the tasks for the slave processes browses for the network port and sends the network port an address associated with the agent hosting the slave process, the master process returning a base port number for a new address and the master process returning a last port number returned to the address incremented by one for a subsequent task using the same address.

19. The computer readable storage medium of claim 18 wherein a controller performs the task providing step.

20. The computer readable storage medium of claim 18 wherein the job includes arguments for determining the master and slave processors and a unique identifier.

21. The computer readable storage medium of claim 20 wherein the master process includes a list of slave processes and their port numbers.

22. The computer readable storage medium of claim 21 wherein each of the slave processes includes its port number.

23. The computer readable storage medium of claim 20 wherein the unique identifier comprises a service name.

24. The computer readable storage medium of claim 18 wherein computers within the network operate in accordance with a message passing interface (MPI) standard.

25. The computer readable storage medium of claim 18 wherein the computer network includes a plurality of computers wherein at least one computer includes a plurality of CPUs.

* * * * *